United States Patent [19]

Azad

[11] Patent Number: 4,800,569
[45] Date of Patent: Jan. 24, 1989

[54] REFLECTOR DESIGN FOR A SLAB LASER

[75] Inventor: Farzin H. Azad, Clifton Park, N.Y.

[73] Assignee: General Electric Company, Schenectady, N.Y.

[21] Appl. No.: 127,028

[22] Filed: Nov. 30, 1987

[51] Int. Cl.$^4$ ............................................... H01S 3/08
[52] U.S. Cl. ......................................... 372/99; 372/33
[58] Field of Search ....................... 372/33, 66, 72, 99, 372/109

[56] References Cited

U.S. PATENT DOCUMENTS

| | | | |
|---|---|---|---|
| 3,577,098 | 5/1971 | Winston | 372/33 |
| 3,609,584 | 9/1971 | Stitch et al. | 372/33 |
| 3,628,180 | 12/1971 | Segre | 372/33 |
| 3,633,126 | 1/1972 | Martin et al. | 331/94.5 |
| 3,646,474 | 2/1972 | Segre | 372/66 |
| 3,700,423 | 10/1972 | Kantorski | 372/33 |
| 3,798,571 | 3/1974 | Segre | 372/33 |
| 4,199,735 | 4/1980 | Chadwick et al. | 372/33 |
| 4,730,324 | 3/1988 | Azad | 372/33 |

OTHER PUBLICATIONS

Allowed U.S. patent application Ser. No. 914,431 entitled "Method and Apparatus for Compensating for Wave Front Distortion in a Slab Laser".
"Theoretical and Experimental Studies of Slab Geometry Lasers" by Eggleston, dissertation submitted for Doctor of Phil., Stanford Univ., 10/82, reprinted by University Microfilms Intl of Ann Arbor, Michigan.
"High-Average-Power Solid-State Glass Laser: Design Notes" by Gagnon et al. Chap. 4, published by Lawrence Livermore Nat. Lab., Aug. 1986.
"Radiation Transport" by Hagen at pp. 6-17 through 6-24 of "Laser Program Annular Report 84" published by Lawrence Livermore Nat. Lab.
U.S. patent application Ser. No. 135,952 entitled "Reflector Design for a Slab Laser".
"Artificial Intelligence Attacks Optical Design" by Hecht, Laser Optronics Magazine, Oct. 1987, pp. 33-38.
"Fitting Curves to Data" by Caceci et al., Byte Magazine, May 1984, pp. 340-362.
"Laser Program Annular Report-1976" Published by Lawrence Livermore Nat. Lab., section entitled "Energy Deposition" at pp. 6-80 and 6-81.

*Primary Examiner*—William L. Sikes
*Assistant Examiner*—B. Randolph
*Attorney, Agent, or Firm*—Paul R. Webb, II; James C. Davis, Jr.

[57] ABSTRACT

A method for computing a reflector shape for an optically pumped slab laser in order to produce a desired focal power lens effect distribution across the width thereof is disclosed. A desired pumping profile corresponding to the desired lens effect distribution is determined. An error function is defined in terms of the deviation of a computed pumping profile from the desired pumping profile. Dimensional parameters descriptive of the reflector shape are then varied to minimize the error function.

7 Claims, 8 Drawing Sheets

REFLECTOR DESIGN FOR A SLAB LASER

This patent application is related to allowed U.S. patent application Ser. No. 914,431 filed on Oct. 2, 1986.

The invention relates in general to slab lasers and, more specifically, to fluid cooled slab lasers.

BACKGROUND OF THE INVENTION

A typical optically pumped, fluid cooled slab laser includes a slab of solid state lasing medium. Pumping means such as a lamp and reflector are situated to impinge optical radiation on the lasing medium in order to pump the atoms in the lasing medium to a metastable state. A cooling fluid is flowed across at least a portion of the lasing medium to remove heat generated therein by the optical pumping. A laser beam is subsequently produced by passing a beam of coherent light, either externally generated or stimulated within the lasing medium, oscillatingly through the lasing medium, the coherent light beam being amplified with each pass through the medium.

Such slab lasers typically exhibit both width-wise and thickness-wise wave-front distortions of the laser beam, the width-wise distortion being particularly prominent in areas proximate lateral edges of the lasing medium. This wave-front distortion diminishes the useable area of the lasing medium, the operating efficiency of the slab laser and the beam quality of the laser beam. Such wave-front distortion is mainly attributable to three known phenomena: (1) width-wise variation of the refractive index of the lasing medium caused by thermal gradients within the lasing medium, i.e. thermal lensing; (b 2) variations in the refractive index of the lasing medium due to a stress-optic effect caused by a nonuniform stress field in thelasing medium; and (3) beam distortion induced by a deformation of major faces of the lasing medium, caused by thermal expansion and compatibility requirement for a lasing medium of finite rectangular cross-section.

Commonly assigned U.S. Pat. No. 3,633,126 entitled "Multiple Internal Reflection Face-Pumped Laser" (Martin et al.), incorporated in its entirety herein by reference, addresses the problem of thickness-wise variation of the refractive index of the lasing medium. In Martin et al., the beam of coherent light is introduced into the lasing medium in an off-axial direction, such that each ray in the beam is multiply, internally reflected in the thickness dimension through regions of varying refractive indexes during each pass through the lasing medium. The varying refractive indexes encountered in the lasing medium thickness dimension and their distortional effects on the beam are thereby minimized.

U.S. Patent No. (allowed U.S. patent application Ser. No. 914,431) entitled "Method and Apparatus For Compensating For Wave Front Distortion in a Slab Laser" (Azad) of common assignment and inventorship, which is incorporated in its entirety herein by reference, addresses the problem of width-wise wave-front distortion. It is observed that the lasing medium exhibits a negative focal power lens effect in lateral edge portions in the width dimension thereof. The invention disclosed therein is directed to apparatus and method for introducing a positive focal power lens effect, approximately equal in magnitude to the negative focal power lens effect, into a central portion of the lasing medium width. Then, the coherent light beam is passed at least twice through the lasing medium and generally along a longitudinally extending lasing axis of the medium such that the rays of the coherent beam wavefront traverse alternate regions of positive and negative focal powers of equal magnitude. In this manner, the wave-front distortion due to variations in refractive index in the lasing medium width dimension are minimized.

The positive focal power lens effect disclosed in the Azad patent is created by shaping the reflector surrounding the pumping means so as to direct greater pumping energy into the central portion of the lasing medium width. The reflector shape is calculated to only apportion an additional amount of pumping energy to the lasing medium central portion sufficient to create a positive focal power lens effect approximately equal in magnitude to the negative focal power lens effect experienced at the lateral edge portions of the lasing medium. A method for computing a reflector shape suitable for accomplishing this end is disclosed in the above-incorporated U.S. Pat. No. [allowed U.S. patent application Ser. No. 914,431] to Azad. The present invention is directed to this computational method.

SUMMARY OF THE INVENTION

A principal object of the present invention is to provide a method of computing the shape of a reflector for use in a face pumped, fluid cooled slab laser so as to introduce a positive focal power lens effect into a central portion of the lasing medium width approximately equal in magnitude to a negative focal power lens effect experienced in lateral edge portions thereof.

Accordingly, there is provided a method for determining a shape of a reflector in a slab laser that includes a solid-state lasing medium having a generally rectangular shape with two opposing major face surfaces. The slab laser includes a first and a second optical pumping lamp respectively disposed adjacent the lasing medium face surfaces for impinging electromagnetic radiation thereon and further includes cooling means for flowing a fluid coolant across at least a portion of the medium. The lasing medium exhibits a negative focal power lens effect in lateral edge portions thereof. The reflector is positioned to generally direct the electromagnetic radiation from the first and second pumping lamps onto the lasing medium face surfaces and has a shape effective to introduce a positive focal power lens effect, approximately equal in magnitude to the negative focal power lens effect, into a central portion of the lasing medium between the lateral edge portions. Together, the positive and negative lens effects represent a desired lens effect distribution across a width dimension of the lasing medium. The inventive method comprises a first step of determining a desired pumping profile effective to produce the desired lens effect distribution. Next, an error function is defined to express a deviation of a computed pumping profile from the desired pumping profile. The shape of the reflector is defined in terms of a set of reflector dimensional parameters. The method then proceeds to the process of selecting a set of values for the reflector dimensional parameters effective to minimize the error function. As a result, the computed pumping profile resulting from the reflector shape defined by the dimensional parameters is sufficiently similar to the desired pumping profile that the desired lens effect distribution is substantially produced.

The process of selecting the dimensional parameter values proceeds with the assignment of initial values to the reflector dimensional parameters to define a current reflector shape. Next, the computed pumping profile corresponding to the current reflector shape is computed. Following this step, a value of the error function based on the pumping profile computed in the previous step is computed. It is next necessary to determine if the value of the computed error function is greater than a predetermined minimum. If it is not, it is concluded that the computed pumping profile resulting from the current reflector shape is effective to substantially produce the desired lens effect distribution. However, if the computed error function is greater than the predetermined minimum, the values assigned to the reflector dimensional parameter are updated in accordance with a numerical minimization technique to minimize the error function and the steps commencing with the computation of the pumping profile corresponding to the current reflector shape (in accordance with the updated parameters) are repeated.

BRIEF DESCRIPTION OF THE DRAWINGS

While the specification concludes with claims defining the features of the invention that are regarded as novel, it is believed that the invention together with further objects thereof, will be better understood from a consideration of the following description in conjunction with the drawing figures, in which:

DESCRIPTION OF THE INVENTION

Figure 1:
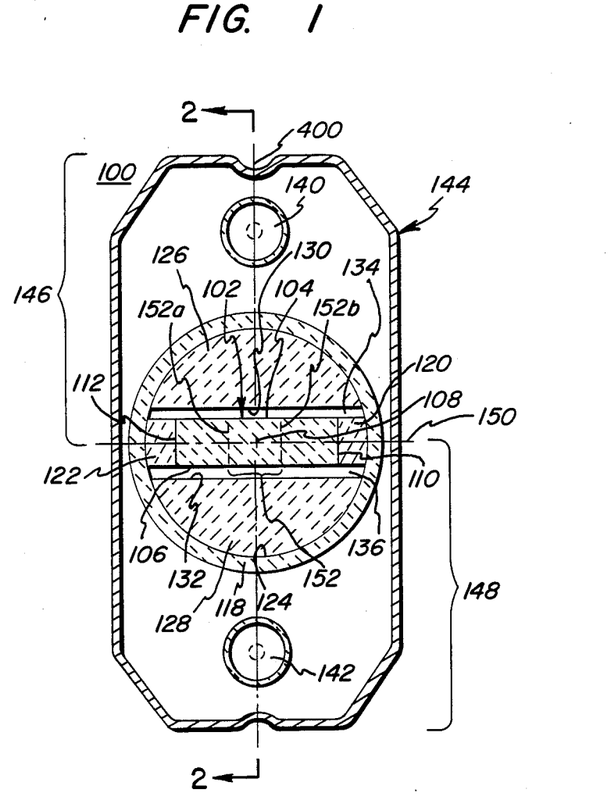
FIG. 1 is a sectional view of slab laser apparatus and is section 1—1 of FIG. 2.
Figure 2:
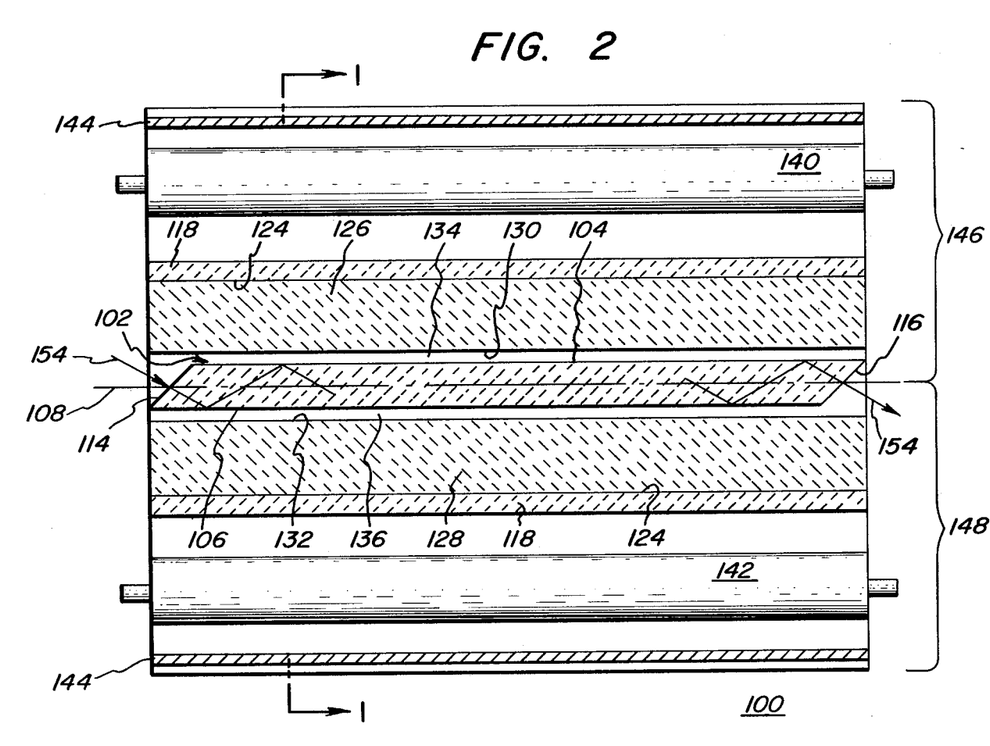
FIG. 2 is section 2—2 of the laser apparatus illustrated in FIG. 1.

Referring now to the drawings, FIGS. 1 and 2 illustrate an optically pumped, fluid cooled slab laser apparatus 100 comprising a generally rectangular lasing medium slab 102 of lasing material. FIG. 1 is a sectional view of the slab as positioned in laser apparatus 100. FIG. 2 is section 2-2 shown in FIG. 1 and thereby illustrates a side view of slab 102 as positioned in the laser apparatus. As can be further seen, the sectional view in FIG. 1 is section 1-1 of FIG. 2. Lasing medium 102 comprises a homogeneous body of solid-state lasing material such as yttrium aluminum garnet (YAG) or neodymium doped silicate (or phosphate) glass. Lasing medium 102 includes a pair of opposing major face surfaces 104 and 106 disposed parallel to each other and to a longitudinally extending lasing axis 108 that extends through the center of the lasing medium cross section. Face surfaces 104 and 106 are polished to optical flatness, i.e. to within about one-eighth of the wavelength of the coherent light emitted by lasing medium 102. A pair of lateral side surfaces 110 and 112 are disposed generally perpendicular to face surfaces 104 and 106 and parallel to axis 108. Side surfaces 110,112 are polished to be sufficiently optically clear so as not to interfere with the optical pumping of the lasing medium. A pair of mutually parallel end surfaces 114 and 116 are disposed, as is known in the art, at a predetermined angle, e.g. 30°, to lasing axis 108. End surfaces 114,116 are preferably polished to optical flatness.

Lasing medium 102 is situated in a tube 118 extending the length of the lasing medium and substantially coaxially with lasing axis 108. Tube 118 comprises a material that is transparent to optical radiation, for example optically clear glass. A pair of optically clear glass supports 120 and 122 extend between lasing medium side surfaces 110 and 112, respectively, and an inner surface 124 of tube 118, to support the lasing medium in a suspended position within the tube. A pair of optically clear glass fillers 126 and 128, each semicircular in cross section, are fastened to tube inner surface 124 and include flat glass surfaces 130 and 132 spaced from lasing medium face surfaces 104 and 106, respectively. There is thus defined a fluid channel 134 between filler surface 130 and lasing medium face surface 104, and a fluid channel 136 between filler surface 132 and lasing medium face surface 106.

Optical pumping means in the form of tubular lamps 140 and 142 are respectively disposed substantially parallel to and coextensive with face surfaces 104 and 106 of lasing medium 102. Lamps 140,142 are employed to generate optical radiation to optically pump lasing medium 102, each comprising a flash-type lamp for emitting optical radiation at wavelengths suitable for exciting the atoms in lasing medium 102 to a metastable state. For example, xenon flashlamps, which provide a pumping wavelength of between 5,000 and 9,000 angstroms, are suitable for pumping a neodymium doped glass lasing medium. To enhance uniformity of the pumping of lasing medium face surfaces 104 and 106, the radiation emitting portions of lamps 140,142 each extend the entire length of the lasing medium face surface proximate the lamp. Also, as is known in the art, each lamp 140,142 is surrounded by a coaxial flow tube (not shown in FIGS. 1 and 2) to form a flow channel, between the lamp surface and flow tube, through which cooling fluid is flowed during operation of laser apparatus 100.

A reflector 144 surrounds lamps 140,142, tube 118 and lasing medium 102. Reflector 144 preferably comprises a high-reflectivity reflector optimized for use with high intensity lamps, for example a water-cooled copper shroud having a silvered or gold plated interior reflecting surface. Reflector 144 is, for convenience of description, viewed as being composed of two substantially identical U-shaped reflector portions 146 and 148, those two reflector portions meeting at a horizontal axis 150 which intersects axis 108 and evenly divides the thickness of lasing medium 102. Thus, reflector portion 146 surrounds lamp 140 and directs electromagnetic radiation emitted by that lamp so as to impinge on surface 104 lasing medium 102. Similarly, reflector portion 148 surrounds lamp 142 to direct electromagnetic radiation emitted thereby to impinge on lasing medium surface 106. In accordance with the invention disclosed in U.S. Pat. No. [allowed U.S. patent application Ser. No. 914,431], reflector 144 is constructed such that portions 146 and 148 thereof concentrate a selected quantity of optical radiation into a central portion 152 (FIG. 1) of lasing medium 102. Central portion 152, delineated by dashed lines 152a and 152b, is substantially centered between side surfaces 110,112 and extends the axial length of lasing medium 102. The selected quantity of optical radiation directed to lasing medium portion 152 by reflector portions 146 and 148 is effective to generate a predetermined quantity of heat therein, and hence a predetermined thermally induced positive lens effect in central portion 152.

In operation, in a manner described in the Martin et al. patent incorporated hereinabove, lamps 140 and 142 are energized to pump optical radiation into lasing medium 102, and thereby excite the atoms in the lasing medium to a metastable state. A cooling fluid (not shown) is flowed over surfaces 104 and 106 of lasing medium 102 via channels 134 and 136, respectively. After exciting the atoms in lasing medium 102 to a metastable state, a beam 154 (Figure 2) of coherent light, generated internally or by another laser device, is oscillatingly passed through lasing medium 102 by multiple internal reflections within the lasing medium in a direction generally along axis 108. Beam 154 is amplified in magnitude during each pass through lasing medium 102. One preferred configuration of optical apparatus which can be used to oscillate and thus amplify beam 154 is illustrated and described in the above-incorporated Azad patent. As indicated above, the multiple internal reflection of the beam, disclosed in the above-incorporated Martin et al. patent, is effective to minimize wave-front distortion caused by variations in the refractive index across the lasing medium thickness dimension.

In accordance with the invention disclosed in the above-incorporated patent to Azad, width-wise distortion of the coherent beam wave-front caused by variations in the lasing medium refractive index across the lasing medium width is overcome by creating the positive lens effect in central portion 152. Then, beam 154 is passed through the lasing medium, as described above, at least twice so that on successive passes the beam is respectively alternately routed through negative and positive focal power regions, of approximately equal magnitude, in the lasing medium width. In this manner, the width-wise wave-front distortion effects due to the negative and positive focal power width regions substantially cancel one another and the width-wise distortion of the wave-front is minimized.

Figure 3A:
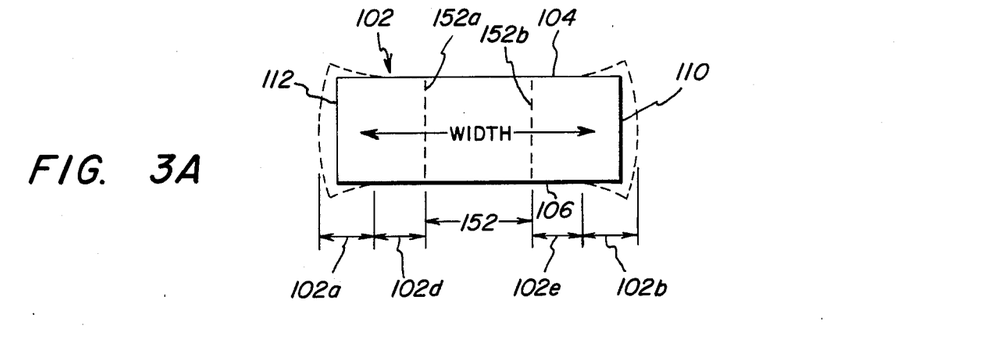
FIGS. 3A, 3B and 3C illustrate a focal power lens effect distribution across the width of the lasing medium of the laser apparatus illustrated in FIGS. 1 and 2.
Figure 3B:
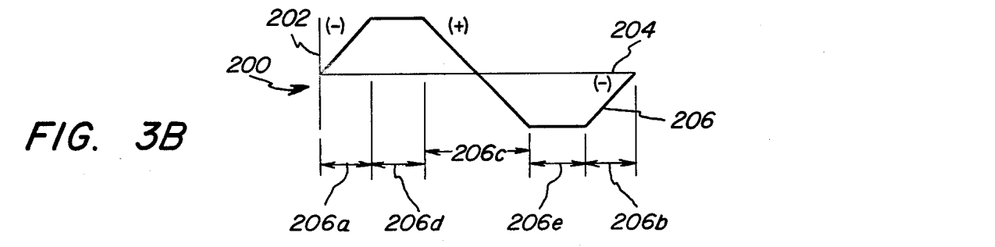

FIG. 3A illustrates lasing medium 102 of laser apparatus 100 (FIGS. 1 and 2), wherein reflector 144 is modified to introduce the selected quantity of optical pumping radiation, hence heat, and hence thermally induced positive lens effect into region 152 of the lasing medium. FIG. 3A represents a schematic illustration of lasing medium 102 viewed from the end, including regions 102a and 102b in which deformation of the major faces of the lasing medium, i.e. face surfaces 104,106, has been experienced, the deformation in each of these regions being indicated by dashed lines. FIG. 3B illustrates a graphical illustration 200 having an ordinate axis 202 representing the magnitude of wave-front distortion due to all causes, i.e. thermal lensing, stress-optic effect and major face deformation. Axis 202 may have the units of milliradians. An abscissa axis 204 of plot 200 represents the lateral width of lasing medium 102 between side surfaces 110 and 112. A plot 206 on graph 200 illustrates the various lens effects across the width of lasing medium 102 during operation of laser apparatus 100. Positively and negatively sloped portions of plot 206 respectively represent regions of lasing medium 102 exhibiting negative and positive lens effects, where the magnitude of the slope represents the amount of focal power, in units such as diopters. Horizontal, zero-sloped regions of plot 206 correspond to regions of the lasing medium exhibiting no net lens effect.

As shown by portions 206a and 206b of plot 206, medium 102 exhibits thermal lens effects of negative focal power in regions 102a and 102b proximate side surfaces 112 and 110, respectively, i.e. proximate the lateral edges of the lasing medium. In accordance with the disclosed invention in the Azad patent, reflector 144 is shaped to introduce sufficient heat into region 152 of the lasing medium to cause that region to exhibit a thermal lens effect of positive focal power, as shown by portion 206c of plot 206. Regions 102d and 102e of lasing medium 102 exhibit no thermal lens effect as shown by horizontal plot portions 206d and 206e, respectively. The positive and negative signs in parentheses further serve to indicate the portions of plot 206 respectively representative of regions of positive and negative focal power. Thus, central region 152 having the positive lens effect is isolated from the regions of negative lens effect, at the lateral edges, by regions exhibiting no focal power lens effect.

Figure 3C:
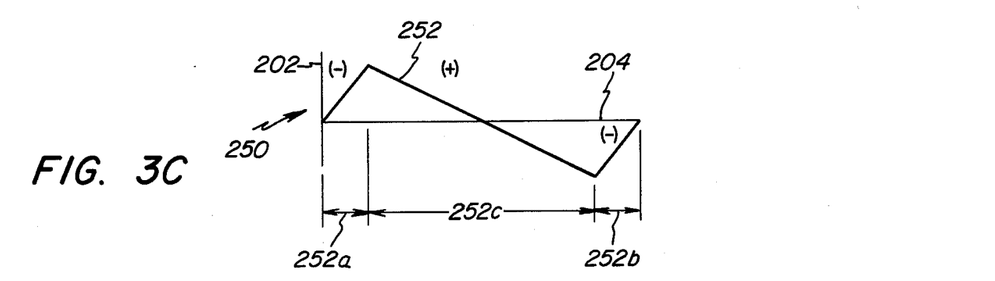

While reflector 144 may be shaped to cause the positive focal power lens effect in central region 152 isolated from the lateral edge regions where the negative lens effect occurs, the minimization of width-wise wavefront distortion may also be successfully practiced by introducing a positive lens effect into a central portion of the lasing medium defined to extend to the negative lens effect edge regions. FIG. 3C illustrates a graphical illustration 250 having the same ordinate and abscissa axes 202 and 204 as in graph 200 in FIG. 3B. A plot 252 includes portions 252a and 252b that represent the same negative focal power lens effects experienced in regions 102a and 102b of slab 102 proximate side surfaces 112 and 110 respectively, and illustrated in FIG. 3A and 3B. A portion 252c of plot 252 represents a positive focal power lens effect resulting from the shaping of reflector 144 to introduce that effect over a central portion of the lasing medium width extending to the negative lens effect regions. As seen in FIGS. 3B and 3C, the slope magnitude of plot portion 252c is less than that of plot portion 206c, indicating that the reflector 144 shape corresponding to plot 252 causes a smaller magnitude of positive lens effect over a wider portion of the lasing medium width than the reflector shape corresponding to plot 206. Again, positive and negative signs indicate the portions of plot 252 representing positive and negative focal power.

Figure 4A:
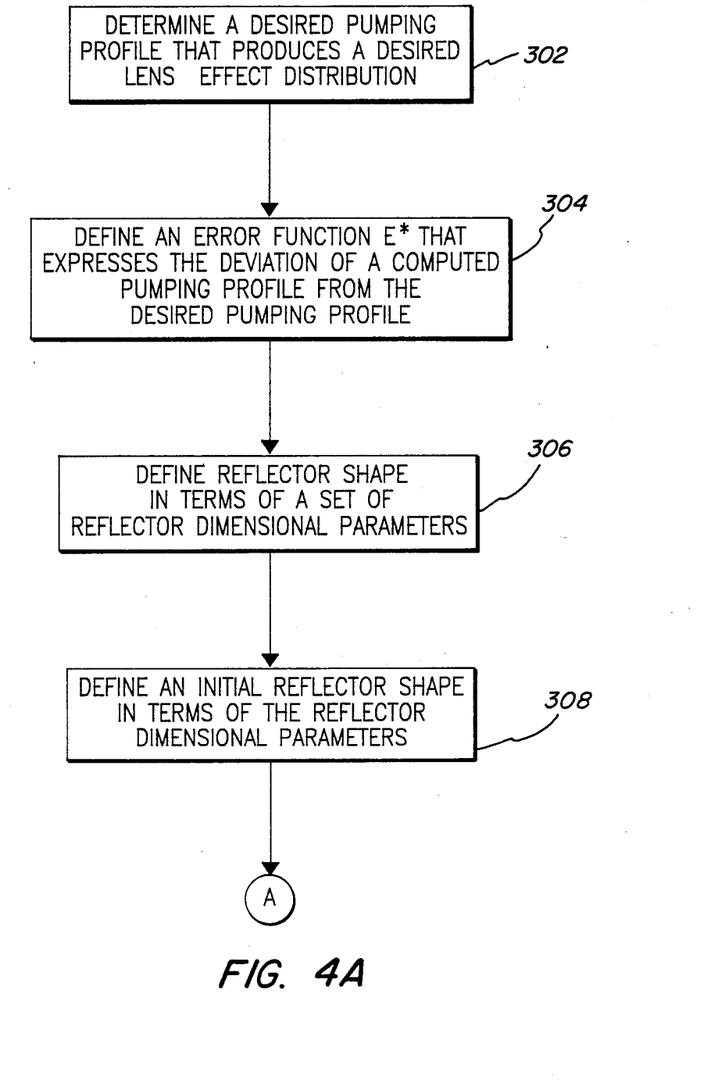
FIGS. 4A and 4B provide a flowchart representation of a preferred embodiment of the method of the present invention.
Figure 4B:
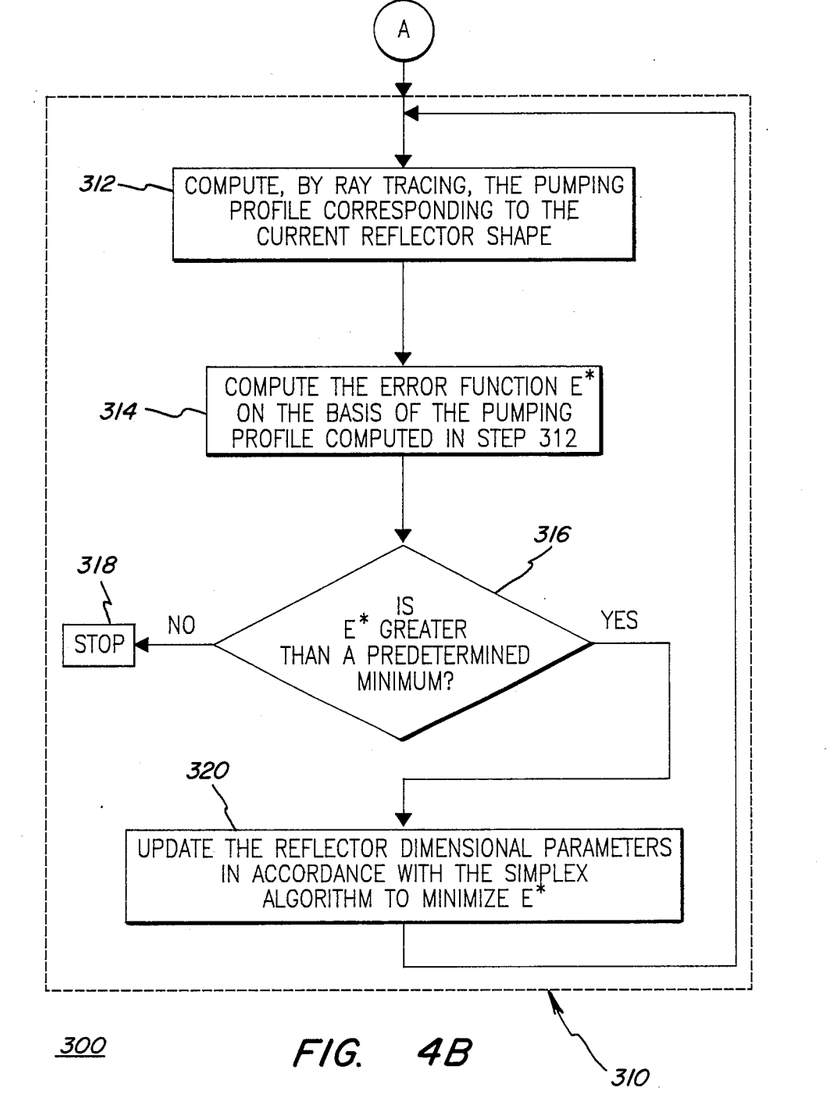

Plots 206 (FIG. 3B) and 252 (FIG. 3C) each represent a desired focal power lens effect distribution, across the lasing medium width, to be achieved in order to minimize width-wise wave-front distortion in accordance with the invention disclosed in the patent to Azad. Given the desired lens effect distribution, the present invention is directed to a method for computing a shape of reflector 144 which results in the desired distribution. FIGS. 4A and 4B illustrate a flowchart representation 300 of a preferred embodiment of the inventive method. Referring to FIG. 4A, commencing with an initial step 302, a computation is performed to determine a desired pumping profile across the lasing medium width that results in the desired lens effect distribution. A pumping profile, as used herein and as well known in the art, is a graphical representation of the amount of pumping energy absorbed per unit volume in the lasing medium as a function of position within the medium. With respect to the practice of the present invention, pumping energy absorption is assumed to be uniform longitudinally within the lasing medium, i.e. along longitudinally extending lasing axis 108. As a result of this assumption, a single pumping profile representing the width-wise distribution of volumetric energy absorption would apply at any point along lasing axis 108. For the preferred practice of the present invention, the volumetric energy absorption at each point along the lasing medium width represents a value averaged over the lasing medium thickness. The amount of energy absorbed in the lasing medium as a function of width position and a model of the slab cooling scheme enables computation of the temperature distribution within the slab. This slab temperature distribution in turn enables computation of the above noted wavefront distorting effect, i.e. thermal lensing, stress-optic effect and major face distortion. The combined effect of the individual wave distorting effects is represented as the focal power lens effect distribution across the lasing medium width. Therefore by an iterative process, a pumping profile that results in the desired lens effect distribution can be determined. Methods for computing the distorting effects from the pumping profile in a face-pumped slab laser are known in the art. One such method is disclosed in "Theoretical and Experimental Studies of Slab Geometry Lasers" by J. M. Eggleston, dissertation submitted for the degree of Doctor of Philosophy, Stanford University, October 1982, reprinted by University Microfilms International of Ann Arbor, Michigan, which is incorporated in its entirety herein by reference.

In the preferred practice of the method of the present invention, advantage is taken of the symmetrical configuration of laser apparatus 100, as viewed in FIG. 1, about horizontal axis 150 and about a vertical axis 400 (FIG. 1), both of which intersect at lasing axis 108. The desired lens effect distribution is assumed to be substantially symmetric about axis 400. As a result, in accordance with the preferred embodiment of the inventive method and as more fully described below, the shape of reflector 144 can be assumed to be symmetric about both axes 150 and 400. It is therefore only necessary to compute the shape for one-quarter of the reflector cross section such as extends between axes 150 and 400.

Figure 5A:
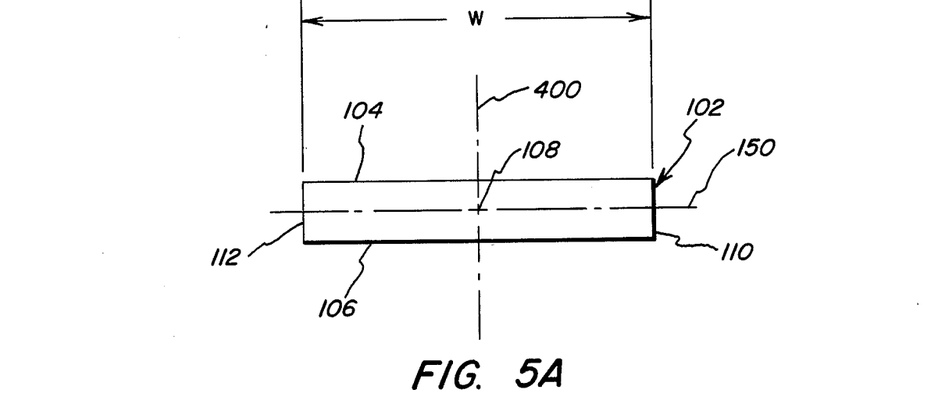
FIGS. 5A and 5B illustrate an exemplary pumping profile across the width of the lasing medium of the laser apparatus illustrated in FIGS. 1 and 2.
Figure 5B:
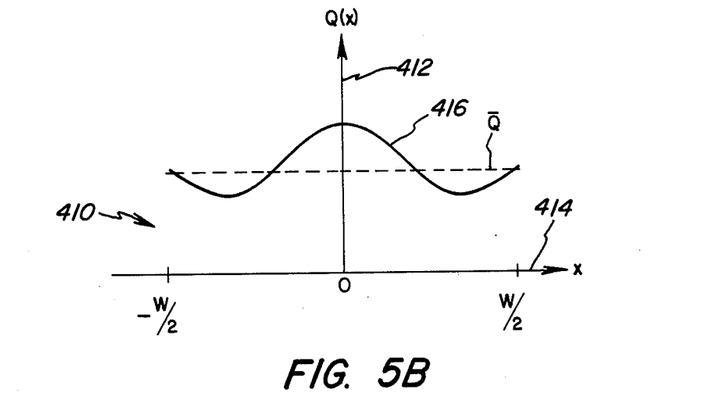

FIG. 5A illustrates any lateral cross section of lasing medium 102, perpendicular to lasing axis 108, with the total width of the lasing medium being indicated as "w". Axes 150 and 400 are also shown in FIG. 5A. In FIG. 5B, a graphical illustration 410 of an exemplary pumping profile is illustrated and has an ordinate axis 412 representing the thickness averaged energy absorption per unit volume $Q(x)$ in lasing medium 102. Axis 412 may have units such as watts/cm$^3$. An abscissa axis 414 of graph 410 represents a position "x" along the width of the lasing medium relative to the center of the lasing medium width. To this end, the ordinate axis is positioned to intersect the abscissa at the point where $x=0$ and is aligned with axis 400. An exemplary pumping profile 416 is plotted on graph 410 and is seen to be symmetric about $x=0$. The average value of volumetric energy absorption across the lasing medium width is shown in FIG. 5B as $\overline{Q}$.

Referring again to FIG. 4A, the method next proceeds to a step 304 in which an error function $E^*$ is defined to express the deviation of a computed pumping profile from the desired pumping profile. Referring again to FIG. 5B, it is preferred herein, for computational convenience, to define a relative pumping profile $q(x)$ that is the variation of $Q(x)$ with respect to $\overline{Q}$. That is: $q(x) \equiv Q(x)/\overline{Q}$.

Then, for the computed and desired pumping profiles, the relative pumping profiles are respectively designated $q_C(x)$ and $q_D(x)$. An expression for the deviation of the computed pumping profile from the desired pumping profile is:

$$E(x) = q_C(x) - q_D(x)$$

It is preferred herein to define the error function $E^*$ as a sum of squares of the deviation of the computed pumping profile from the desired pumping profile at a plurality of M points $x_i$ uniformly spaced across a predetermined portion of the lasing medium width for which the reflector shape is being determined. To wit:

$$E^* = \sum_{i=1}^{M} E(x_i)^2.$$

In view of the above noted assumed symmetry of the reflector shape about axis 400, the error function is defined for only one-half of the lasing medium width. The number of different values of "$x_i$" over which $E(x_i)^2$ is summed is a matter of design choice. As described hereinbelow, it is preferred herein to model the portion of the lasing medium width under consideration as a plurality of finite width elements. Then, each $x_i$ corresponds to a different width element and each error function value $E(x_i)$ represents the difference between the computed and desired pumping profile values for the width element corresponding to $x_i$.

An alternate definition of the error function that may be used is the maximum of the absolute values of the deviations of the computed pumping profile from the desired pumping profile experienced across the predetermined portion of the lasing medium width:

$$E^* = \underset{i=1, 2, \ldots, M}{\text{Max}} (|E(x_i)|).$$

Again, in view of the symmetry of the reflector shape about axis 400, the error function is defined for one-half of the lasing medium width. Having defined $E^*$, it is clear that the object of the inventive method is to determine a reflector shape for which $E^*$ is minimized.

Referring again to FIG. 4A, step 306 is next performed in which a set of reflector dimensional parameters are defined to described the reflector shape. Since as indicated above, in consideration of the symmetrical configuration of laser apparatus 100, only one-quarter of the reflector shape need be computed, the set of reflector dimensional parameters is defined for one-quarter of the shape. A sectional view of the one-quarter of the laser apparatus cross section extending between axis 150 and 400 is diagrammatically illustrated in FIG. 6. Elements of the laser apparatus are identified with the same reference numerals as appear in FIG. 1. For clarity, only an interior surface 144i of reflector 144 is shown since the reflector dimensional parameters are defined in terms of that surface. Lamp 140 is shown in greater detail in Figure 6 and includes, in cross section, a flash lamp tube 500 respectively having inner and outer tube surfaces 500a and 500b and, as previously described, a coaxial flow tube 502 surrounding lamp tube 500 and having inner and outer flow tube surfaces 502a and 502b, respectively. A fluid coolant flow channel 504 is thereby defined between surfaces 500b and 502a.

Figure 6:
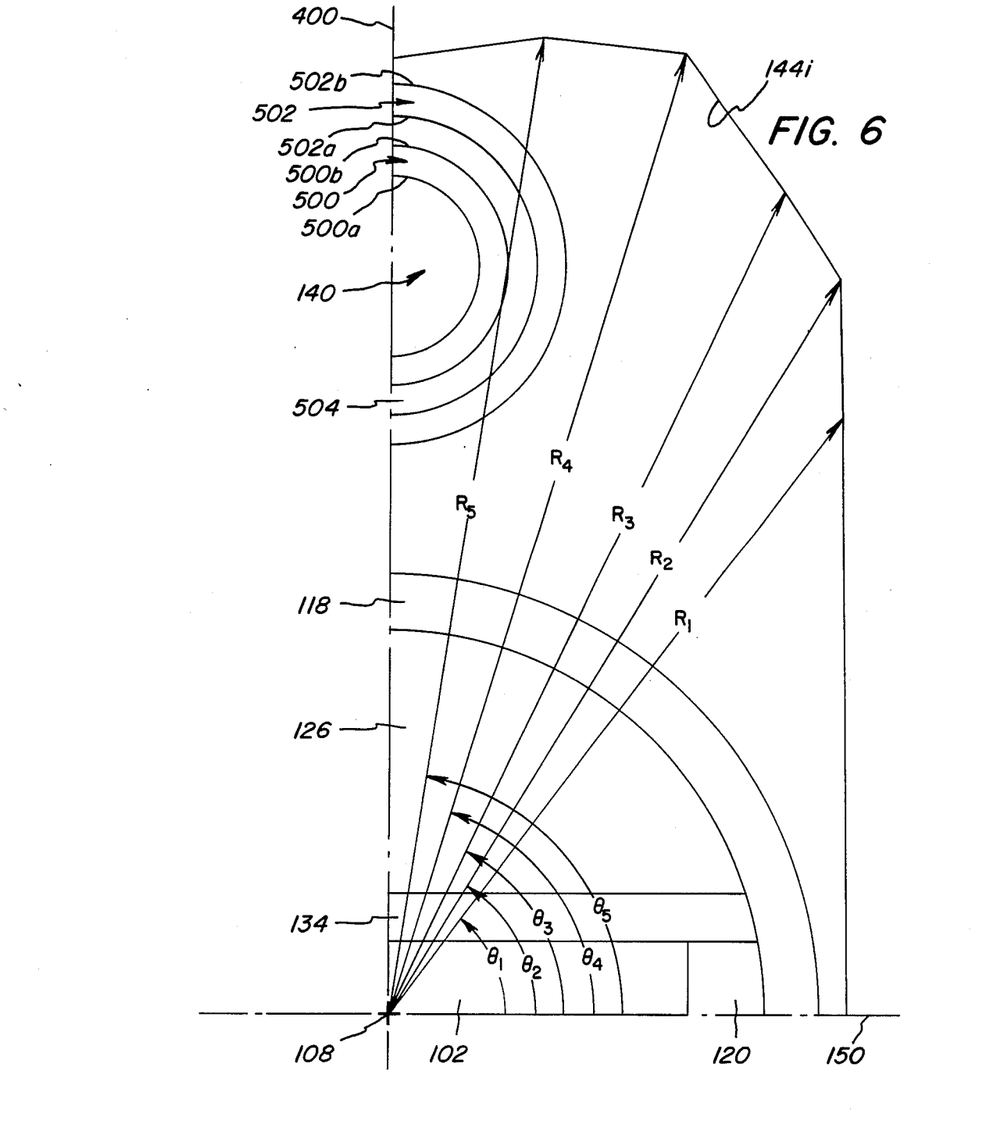
FIG. 6 illustrates exemplary reflector dimensional parameters for use in defining the shape of the laser apparatus reflector.

It is preferred herein to define the reflector dimensional parameters as a plurality of radial distances emanating from the intersection, at axis 108, of axes 150 and 400 and extending to the reflector. Each radial distance is set at a predetermined angle relative to a reference axis such as axis 150. An exemplary set of five dimensional parameters $R_1$ through $R_5$ are shown in FIG. 6 respectively at predetermined angles $\theta_1$ through $\theta_5$ measured relative to axis 150. The points of intersection between the reflector 144 interior surface and axes 150 and 400 can either be fixed or assigned as additional dimensional parameters. The radial distances represented by parameters $R_1$ through $R_5$ all lie in the plane of FIG. 6 which is perpendicular to axis 108. Thus, the dimensional parameters and hence the reflector shape are defined in two dimensions. Since E* is a function of pumping profiles and each computed pumping profile is a function, in part, of the reflector shape, the error function may be stated as a function of the reflector dimensional parameters. For a general case of N dimensional parameters $R_1, R_2, \ldots, R_N$, the error function is $E^*(R_1, R_2, \ldots)$, and the object of the inventive method is more succinctly stated to find a set of dimensional parameters $R_1, R_2, \ldots, R_N$ for which $E^*(R_1, R_2, \ldots, R_N)$ is minimized.

Referring again to FIG. 4A, the method proceeds to a step 308 in which an initial "guess" is made at the reflector shape. That is, an initial set of values are assigned to the dimensional parameter set. At any time in the course of practicing the present method, the set of values currently assigned to the dimensional parameters represents a current reflector shape. Thus at this point in the method, the initial guess at the reflector shape represents the current reflector shape. Given the set of initial values assigned to the reflector parameter set, the remaining computational task is to vary these values in a manner effective to minimize E*. In the preferred embodiment, this remaining task is illustrated in FIG. 4B, in which flowchart 300 continues, as a step 310. Numerical optimization/minimization techniques known in the art, including the Simplex algorithm preferred herein, are typically structured to optimize (minimize in the present invention) a particular function upon being provided with an initial set of values for the function variables.

Thus, still referring to FIG. 4B and within step 310, the method proceeds to a step 312 in which a pumping profile is computed based on the current reflector shape. This computation is performed by a process of ray tracing. The ray tracing is performed in the one-quarter portion of laser apparatus 100 which is illustrated in FIG. 6 and again shown in FIG. 7 for the purpose of illustrating ray tracing as practiced in the present invention. The use of ray tracing to compute the pumping profile in a lasing medium is known in the art. An example of one such use of ray tracing is described in Chapter 4 of the report entitled: "High-Average-Power Solid-State Glass Laser' Design Notes" by W. L. Gagnon et al., published by Lawrence Livermore National Laboratory, August 1986. Chapter 4 of that report describes a ray tracing technique in which the rays are generated at each optical pumping lamp in accordance with a Monte Carlo technique. While the method of the present invention can be successfully practiced using such a Monte Carlo technique to generate rays, a different ray generation technique is preferred herein.

In the preferred practice of the present invention, rays are emitted from a predetermined number of points uniformly distributed on the inner surface of the lamp. The selection of a sufficient number of points assures sufficiently accurate ray tracing results. The electromagnetic radiation emitted at each predetermined point on the lamp inner surface is modeled as a fan of rays having a particular spectral composition. A discussion of the theory underlying the lamp emission model employed in the preferred practice of the present invention is disclosed in an article entitled: "Radiation Transport" by W. F. Hagen which appears at pages 6–17 through 6–24 in the "Laser Program Annual Report 84" published by Lawrence Livermore National Laboratory, that article being incorporated in its entirety herein by reference. The path of each ray so emitted is reflected and refracted within the one-quarter portion of laser apparatus 100 and may fall incident on lasing medium 102. The paths of two exemplary rays 552 and 554 are traced in FIG. 7. In the preferred practice of the present invention, rays are only traced in a two dimensional plane perpendicular to axis 108, e.g. the plane of FIG. 7. Tracing rays in two dimensions to compute the pumping profile is possible due to the above noted assumption of a substantially uniform pumping profile along axis 108.

Figure 7:
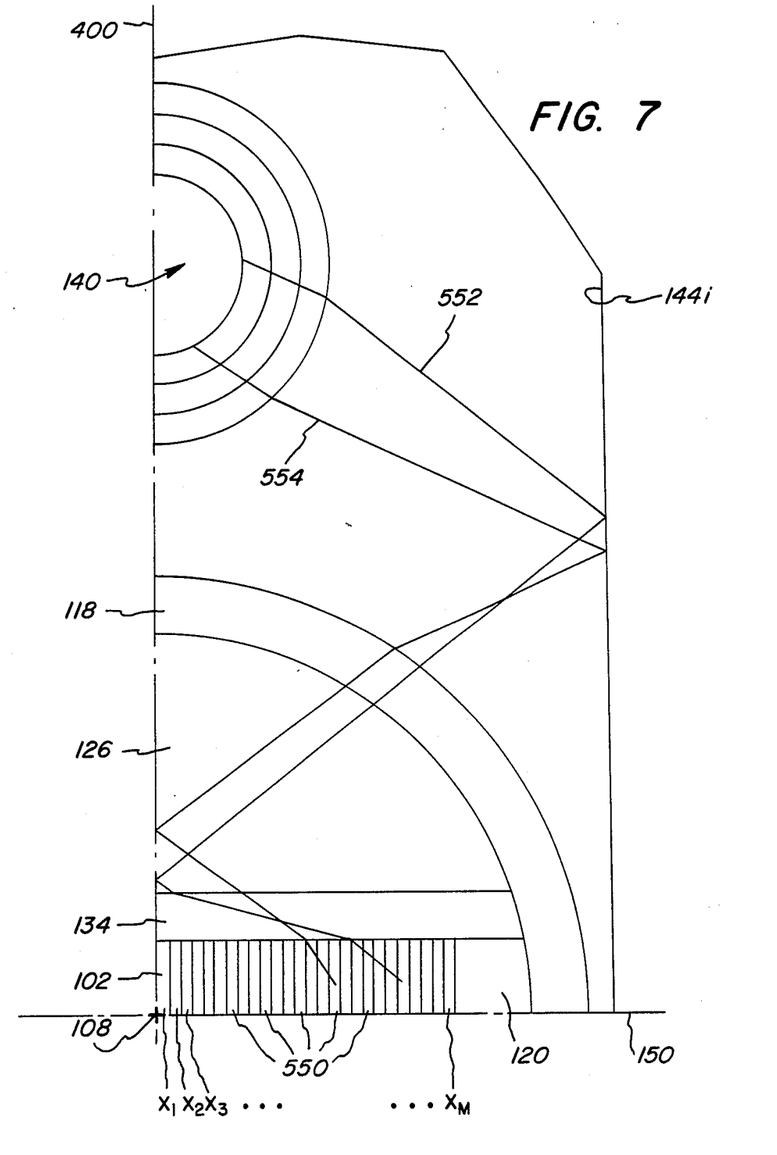
FIG. 7 illustrates a ray tracing technique used in the practice of the present invention to compute a pumping profile.

Lasing medium 102 is represented as a finite element model consisting of a plurality of width elements 550. The absorption by each width element 550 of the energy of incident electromagnetic rays is modeled to be spectrally dependent. That is, whether an incident ray is absorbed in the lasing medium and the amount of energy absorbed from the ray are a function of the spectral composition of the particular ray and the spectrally dependent absorptive properties of the lasing medium. In this manner, the amount of energy absorbed in each width element 550 can be summed and a pumping profile computed across the lasing medium width. As noted above, it is preferred herein that each value $x_i$ defined above corresponds to a different one of the width elements of the lasing medium finite element model. Such correspondence between the value of $x_i$ for $i=1,2,\ldots,M$ and the width elements is illustrated in FIG. 7. Then, in computing $E(x_i)$, the value of $q_C$ or $q_D$ respectively corresponds to the computed or desired energy absorbed in the width element corresponding to $x_i$. It is also noted that due to the symmetry of the laser apparatus 100 configuration about axis 400, rays are assumed to reflect off of axis 400. While such rays would otherwise normally travel across that axis and fall incident on the portion of lasing medium 102 to the left of axis 400, as viewed in FIG. 7, the reflected rays simulate corresponding rays which are emitted by the portion of lamp 140 to the left of axis 400 and cross axis 400 at the points of assumed reflection to follow paths coincident with the reflected rays. It is additionally noted that in the preferred practice of the inventive method, the absorption of energy from each ray as it passes through the various other elements of the laser apparatus, exclusive of the lasing medium, is assumed to be a spectrally averaged absorption and is considered in the overall computation of the pumping profile.

Referring again to FIG. 4B, the method continues to a step 314 in which the error function E* is computed on the basis of the pumping profile computed in step 312. Then at a step 316, the magnitude of E* is compared to a predetermined acceptable minimum value for E* which represents an acceptable correspondence between the computed and desired pumping profiles. If the magnitude of E* is determined to be less than or equal to the acceptable minimum value, the method stops (step 318) and the current reflector shape is determined to be effective to substantially produce the desired lens effect distribution. The phrase "substantially produce" is employed to recognize the small deviation that may exist between the computed and desired pumping profiles as permitted by the acceptable minimum value of E* If the magnitude of E* is greater than the acceptable minimum value, the method proceeds to a step 320 in which the reflector dimensional parameters are updated in accordance with the particular numerical minimization technique being employed, which in the illustrated embodiment is the Simplex algorithm, that algorithm being well known in the art. With the reflector dimensional parameters so updated to represent the current reflector shape, the method returns to step 312 to repeat steps 312 through 316. The method of the preferred embodiment of the present invention has been programmed in the Fortran 77 language and successfully run on a Digital Equipment Corporation VAX 8600 computer.

While the use of the Simplex algorithm is preferred herein to achieve a set of reflector dimensional parameters which minimizes the error function, the invention is not so limited. Other numerical optimization/minimization techniques, such as the Powell method, are well known in the art and the present invention can be practiced with equal effectiveness in employing such other techniques.

While the reflector dimensional parameters illustrated hereinabove represent a set of radial distances at predetermined angles relative to a reference axis, the invention is not so limited. The dimensional parameters could instead be represented as a set of radial distances the angle for each of which, relative to the reference axis, is also subject to variation in accordance with the minimization algorithm. Alternatively, one or more segments of the reflector shape can be predetermined to have a particular geometric shape, e.g. a circular arc, which is described by parameters, e.g. the arc radius, which are varied in accordance with the minimization algorithm.

The finite element model of the lasing medium used to compute the pumping profile by ray tracing is represented as a plurality of width elements. The invention is, however, not so limited. Each width element of the lasing medium may additionally be divided into thickness elements. The inventor has, however, determined that the additional accuracy achieved through such finer granularity in the finite element representation of the lasing medium is not sufficient to justify the additional burden on computing resources associated therewith.

While a particular lamp emission model has been described hereinabove, the invention is not so limited. Other emission models are known in the art and may be used in the practice of the present invention. While two error functions have been defined hereinabove for minimization to compute the desired reflector shape, other error functions may occur to those skilled in the art and the invention successfully practiced therewith.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for determining a shape of reflector in a slab laser including a solid-state lasing medium having as generally rectangular shape with two opposing major face surfaces, said slab laser including a first and a second optical pumping lamp respectively disposed adjacent said lasing medium face surfaces for impinging electromagnetic radiation thereon and further including cooling means for flowing a fluid coolant across at least a portion of said lasing medium, said lasing medium exhibiting a negative focal power lens effect in lateral edge portions thereof, said reflector being positioned to generally direct the electromagnetic radiation form said first and second pumping lamps onto said lasing medium face surfaces and having a shape effective to introduce a positive focal power lens effect approximately equal in magnitude to said negative focal power lens effect into a central portion of said lasing medium between said lasing medium lateral edge portions, the last recited positive and negative lens effects representing desired lens effect distribution across a width dimension of said lasing medium, said method comprising the steps of:

(a) computing amounts of pumping energy absorbed in said lasing medium, as a function of width position, effective to produce a temperature distribution in said lasing medium which in turn produces said desired lens effect distribution, the amounts of absorbed pumping energy so computed corresponding to a desired pumping profile;

(b) assigning a predetermined initial set of values to a predetermined set of reflector dimensional parameters descriptive of the shape of said reflector, said initial values defining a current reflector shape;

(c) computing by ray tracing, based on the current reflector shape, a computed pumping profile corresponding to amounts of pumping energy absorbed in said lasing medium as a function of width position;

(d) computing a value of a predetermined error function that expresses a deviation of said computed pumping profile from said desired pumping profile;

(e) comparing the value of said error function computed in step (d) with a predetermined minimum value of said error function which represents an acceptable correspondence between said computed and desired pumping profiles and if said computed value is greater than the predetermined minimum value of said error function proceeding to step (f) and, if not, to step (g);

(f) updating the values assigned to said reflector dimensional parameters in accordance with a numerical minimization technique to minimize said error function and repeating steps (c) through (e) with the updated reflector dimensional parameters defining the current reflector shape; and (g) stopping the method since the computed pumping profile resulting from the current reflector shape is sufficiently similar to said desired pumping profile that said desired lens effect distribution is substantially produced.

2. The method of claim 1 wherein the simplex algorithm is employed as said numerical minimization technique.

3. The method of claim 1 wherein step (a) is performed to compute amounts of pumping energy effective to produce said desired lens effect distribution such that said positive lens effect in the central portion of said lasing medium is isolated from said regions of negative lens effect at said lateral edge portions by regions exhibiting no focal power lens effect.

4. The method of claim 1 wherein step (a) is performed to compute amounts of pumping energy effective to produce said desired lens effect distribution such that the central portion of said lasing medium into which said positive lens effect is introduced extends to said lateral edge portions in which said negative lens effect is experienced.

5. The method of claim 1 wherein said error function is defined as a sum of squares of the deviation of said computed pumping profile from said desired pumping profile at a plurality of points across a predetermined portions of the width dimension of said lasing medium.

6. The method of claim 2 wherein said error function is defined as a maximum of the absolute values of the deviations of said computed pumping profile from said desired pumping profile experienced across a predetermined portion of the width dimension of said lasing medium.

7. The method of claim 1 wherein in the performance of steps (b) and (f) said reflector dimensional parameters are a set of radial distances from a cross section center point of said lasing medium to different locations on an interior surface of said reflector, the set of radial distances all lying in a common plane substantially perpendicular to a longitudinally extending lasing axis of said lasing medium.

* * * * *